March 31, 1964 AKIRA ISHIBASHI 3,126,868
PREFABRICATED REVOLVING CYLINDRICAL HEN-HOUSE
Filed Jan. 12, 1962 8 Sheets-Sheet 8
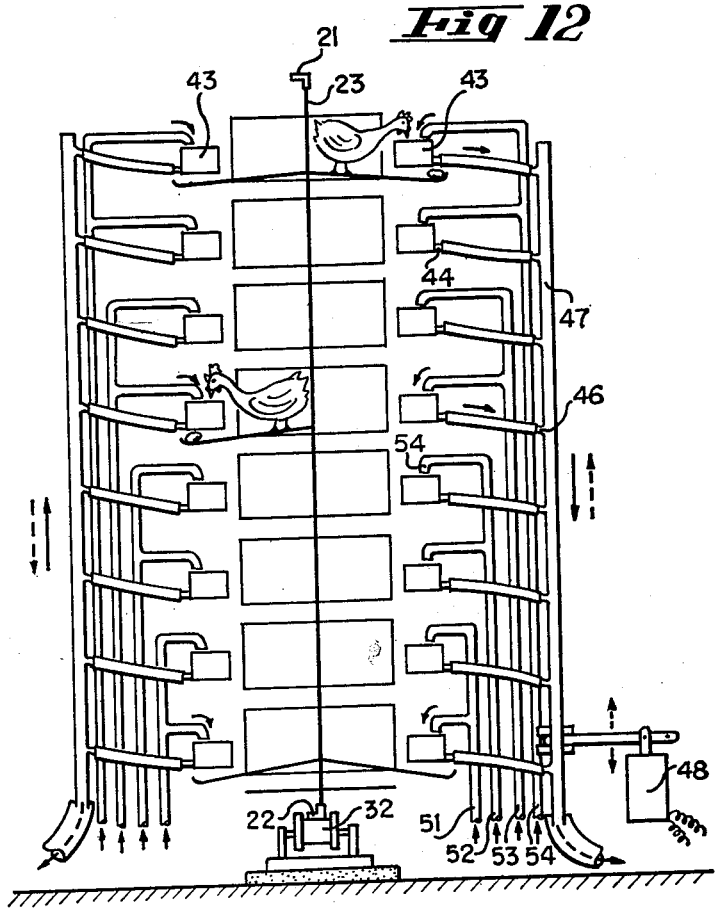

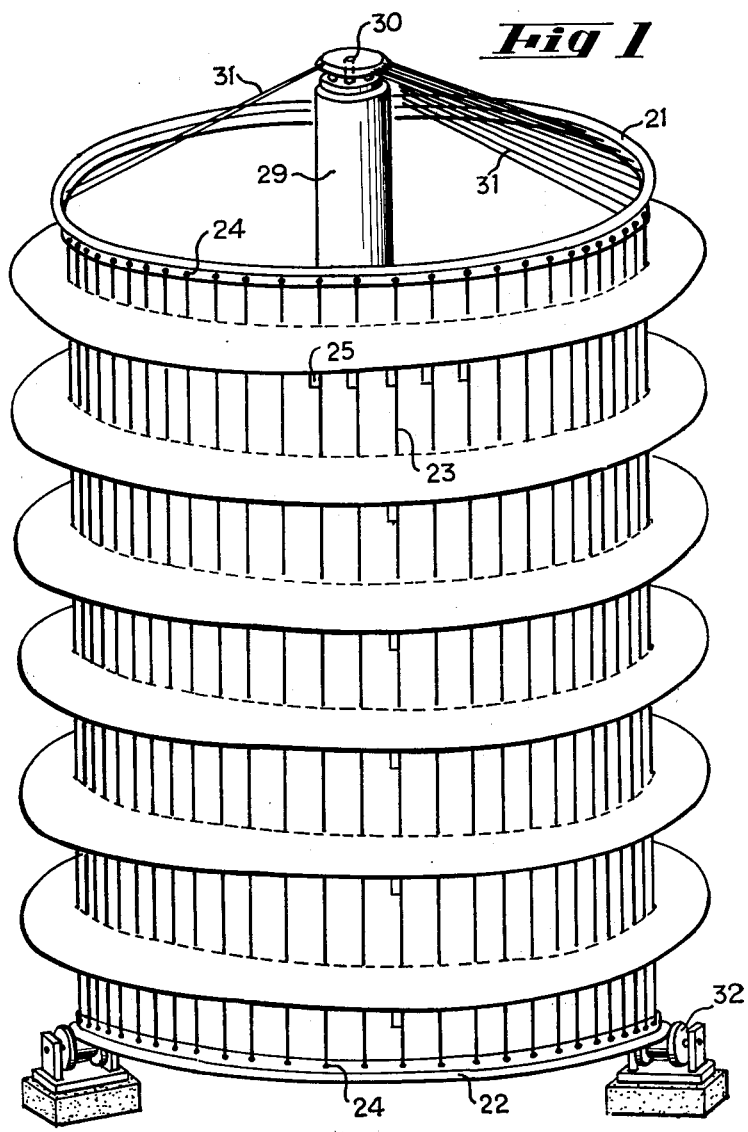

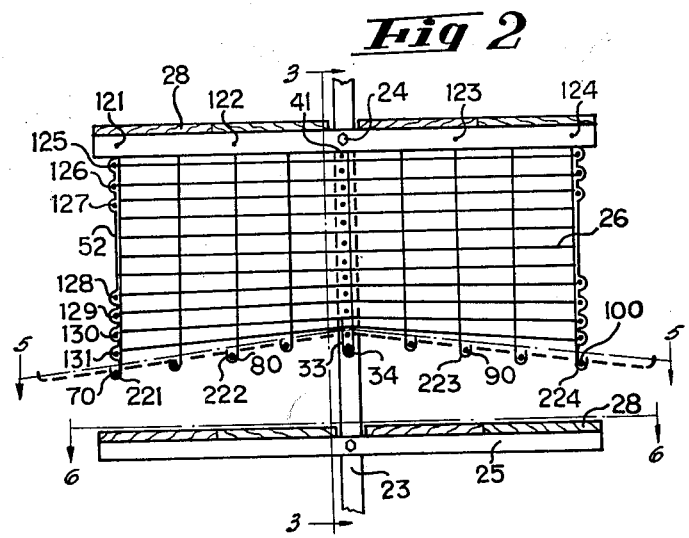
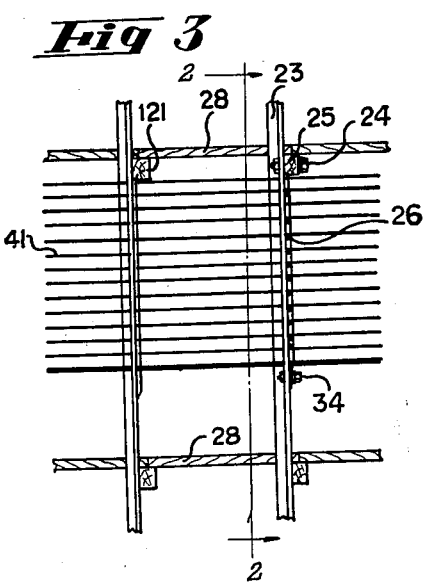

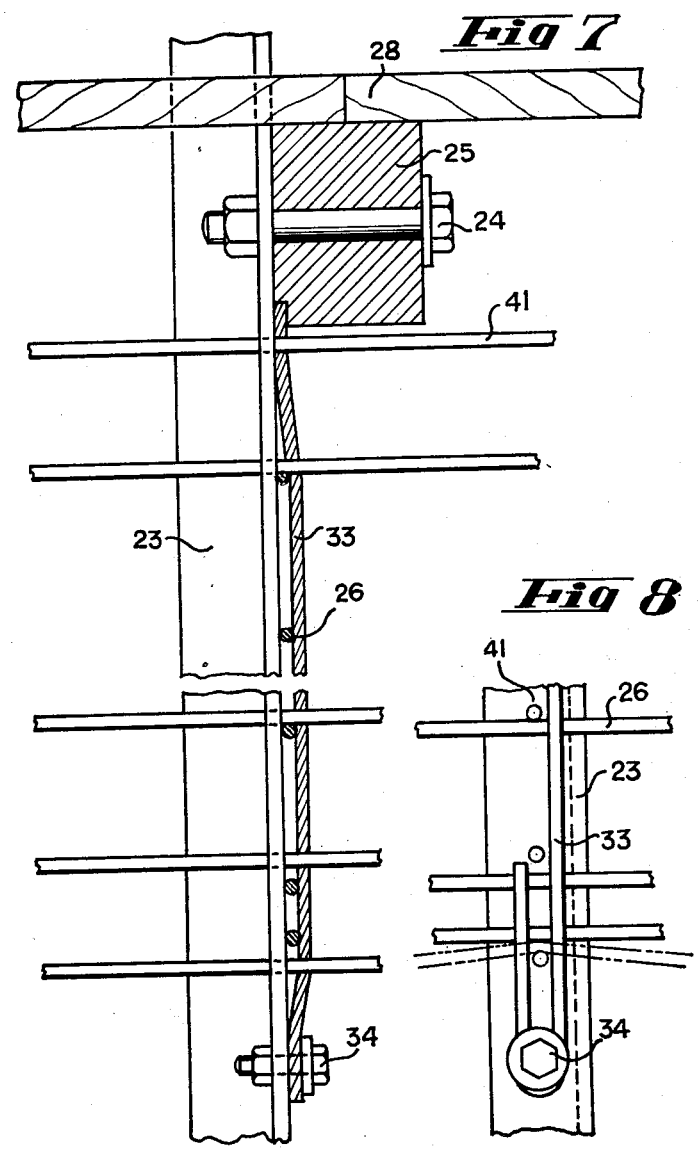

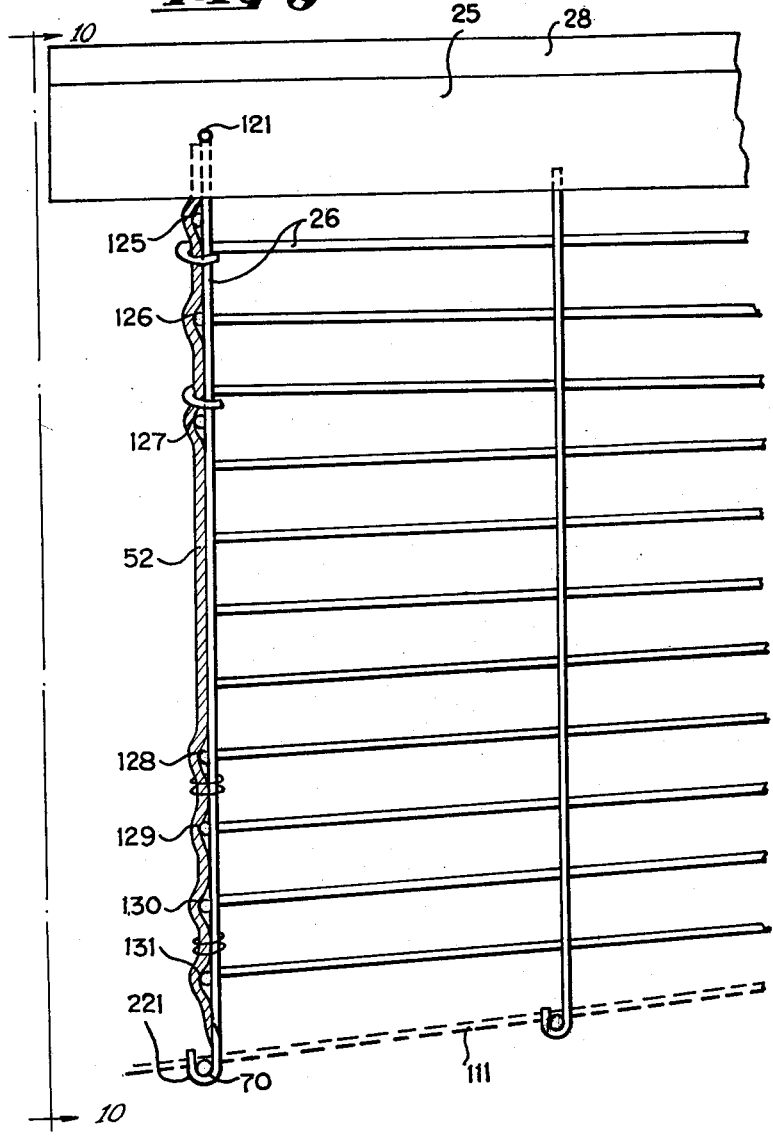

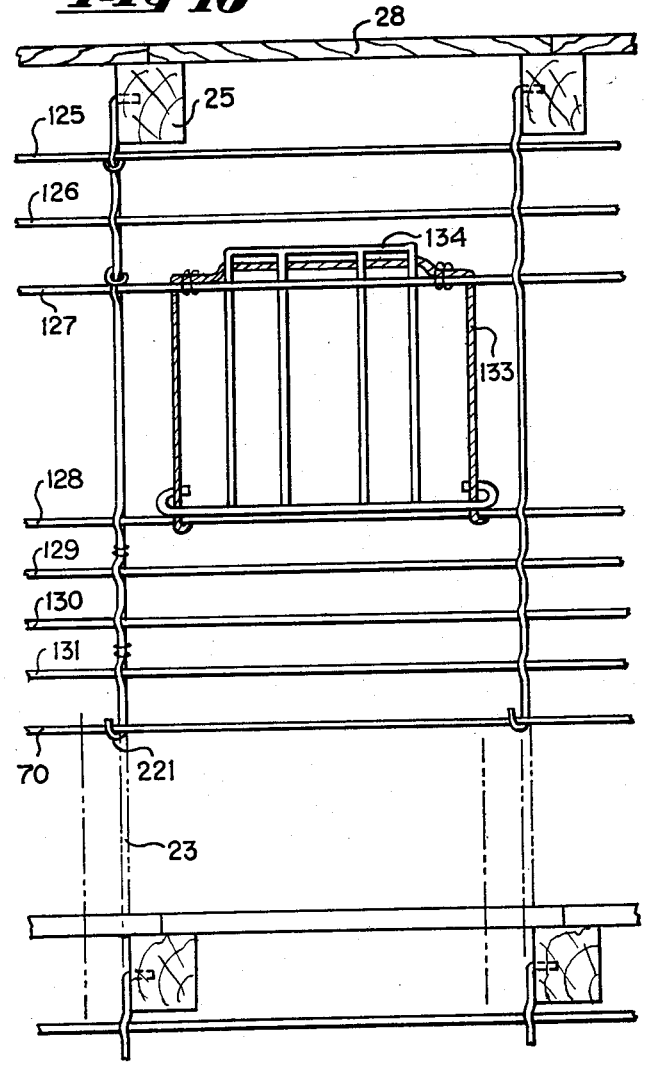

United States Patent Office 3,126,868
Patented Mar. 31, 1964

3,126,868
PREFABRICATED REVOLVING CYLINDRICAL HEN-HOUSE
Akira Ishibashi, Fukuoka-shi, Japan, assignor to Nippon Reizo Kabushiki Kaisha, Tokyo, Japan
Filed Jan. 12, 1962, Ser. No. 165,892
5 Claims. (Cl. 119—21)

This invention relates to a prefabricated revolving cylindrical hen-house.

It is known that a revolving cylindrical hen-house is very favourable and advantageous in raising poultry on a large scale. However, it is essential that a revolving cylindrical hen-house must be built highly precisely as, if the hen-house is out of round, an automatic feeder and an automatic waterer cannot cooperate properly with the hen-house as they will be, at least in certain positions at the revolving hen-house, too far from the periphery of the hen-house adequately to feed and water a hen in a nest in the hen-house. Furthermore, in order to be long left weather-beaten while being revolved continuously, the hen-house must be precise and durable. Meantime, in view of the nature of the poultry husbandry, it is frequently required to build a revolving cylindrical hen-house in a country remote from an industrial district and, in turn, to transport a prefabricated hen-house to a country from a works in an industrial region and assemble the same at a lot in the country using very conventional tools only.

One object of this invention is to provide a prefabricated revolving cylindrical hen-house which is easy to assemble without any special tool.

Another object of this invention is to provide a prefabricated revolving cylindrical hen-house which is easy to transport in a disassembled state.

Still another object of this invention is to provide a prefabricated revolving cylindrical hen-house which is durable in construction and precise in dimension, such as of roundness.

Briefly stated, in accordance with one aspect of this invention, there is provided a prefabricated revolving cylindrical hen-house to be carried by a center pole and supported auxiliarly by rolling members arranged annularly on the base. The hen-house comprises a carrying member to be arranged on the top of the pole, a top annular shape steel member to be hung from the carrying member by a plurality of spokes, a bottom annular shape steel member to be adapted to set on the rolling members, vertically connecting steel members as many as the number of nests arranged on a floor or the half thereof, horizontal beam wood members as many as the number of the vertically connecting steel members, dropping boards as many as the number of the nests, and partitions. The carrying member is adapted to carry the hen-house revolvable on the top of the pole. The bottom annular shape steel member is to be arranged coaxially and in parallel with the top annular shape steel member and connected therewith by means of a plurality of the vertically connecting steel members arranged at regular intervals with each other. The horizontal beam wood member is to be arranged radially and fixed to the vertically connecting steel member. The droppings board are of trapezoidal and to be arranged between two neighbouring horizontal beam wood members. The partitions are metal nettings, and are to be fixed to the vertically connecting steel members and the horizontal beam wood members.

The invention will be better understood and other objects and additional advantages of the invention will become apparent upon perusual of the following description taken in connection with the drawings, and the scope of the invention will be defined in the appended claims.

In the drawings:

FIG. 1 is a perspective view of a revolving cylindrical hen-house embodying the principles of this invention showing the hen-house built on a site;

FIG. 2 is a radial sectional view of the hen-house to an enlarged scale, and taken on the line 2—2 of FIG. 3;

FIG. 3 is an enlarged scale sectional view of the hen-house taken on the line 3—3 of FIG. 2;

FIG. 7 is a greatly enlarged partial sectional view taken generally on the line 3—3 of FIG. 2;

FIG. 8 is a right side elevational view taken of part of FIG. 7;

FIG. 9 is a greatly enlarged sectional view taken on the line 9—9 of FIG. 5;

FIG. 10 is a partial elevational view, to an enlarged scale, and partly in section, taken essentially on the line 10—10 of FIG. 9 and illustrating the door of a nest;

FIG. 12 is a somewhat diagrammatic radial sectional view illustrating the waterers.

Figure 4:
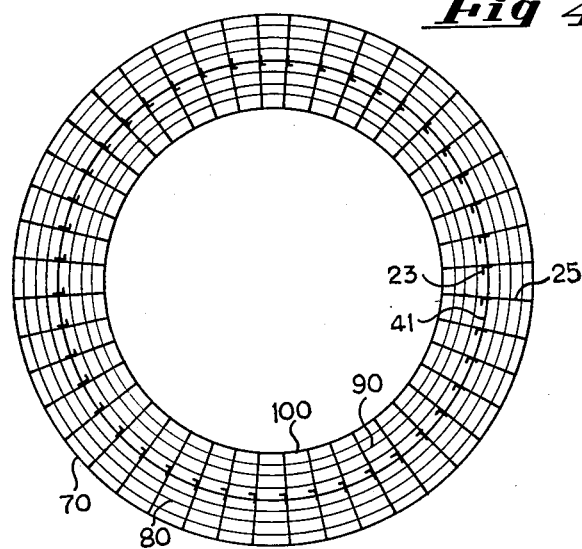
FIG. 4 is a plan view of the floor of the hen-house, drawn to a reduced scale.

Referring more particularly to the drawings, the preferred embodiment of this invention will now be described; however, this description will be understood to be illustrative of the invention and not as limiting it to the particular construction shown and described.

There is a carrying member 30 comprising a bottom part to be secured on the top of the center pole 29 and a top part revolvable on the bottom part about a vertical axis in alignment with the center pole 29. Between the top part and the bottom part, a roller bearing is inserted so as to facilitate the revolution of the top part with respect to the bottom part. A plurality of perforations is provided along the periphery of the top part for fixing ends of spokes 31, respectively.

The hen-house includes a top annular steel member 21 and a bottom annular steel member 22 which are essentially congruent with each other although arranged in mirror relation. These members 21 and 22 may either be circular or they may be polygonal. The top annular steel member 21 is provided with two series of perforations, one being to receive threaded ends of the spokes 31 to hang the top annular shape steel member 21 from the top part of the carrying member 30, and the other being to receive threaded upper ends of vertically connecting steel members 23. The bottom annular shape steel member 22 is provided with a series of perforations which is to receive the lower ends of the vertically connecting steel members 23. The bottom annular shape steel member 22 is adapted to be set on the rolling members 32 provided on the base so as to carry the revolving cylindrical hen-house revolvably.

Each vertically connecting steel member 23 has threaded ends which are to be inserted through the perforations provided in the top annular shape steel member 21 and the bottom annular shape steel member 22 and fixed thereon by means of nuts 24. Each vertically connecting steel member 23 is provided with a plurality of horizontal perforations whereby a horizontal beam wood member 25 and partitions 26 are fixed to that vertically connecting steel member 23. A trapezoidal droppings board 28 made of wood, is adapted to be extended between two neighbouring beam wood members 25.

In building, the center pole 29 is built at the center of a site and rolling members 32 are arranged coaxially with the center pole 29 so as to set the bottom annular shape steel member 22 revolvably. The carrying member 30 is secured on the top of the center pole 29, whereby the whole weight of the hen-house is to be carried while the rolling members 32 are to be considered auxiliary means for supporting the weight. The spokes 31 are fixed to the carrying member 30 at one end of each thereof. The other ends of the spokes 31 are fixed to the top annular shape steel member 21 by means of nuts 24 screwed on the threaded ends.

Meantime, horizontal beam wood members 25 and partitions 26 are fixed to each vertically connecting steel members 23. They are equal in number to the number of nests to be built or the half thereof. A horizontal beam wood member 25 is fixed to the vertically connecting steel member 23 by means of a bolt and a nut 24 arranged circumferentially, and may swing about the bolt. The partitions 26 are prefabricated metal nettings. Upper ends 121, 122, 123, and 124 of wires of the netting 26 are inserted through perforations provided in the horizontal beam wood member 25 and bent so as to keep the partition 26 in place. A length of wire 33 is anchored between the bolt 24 and another bolt 34 fixed to each vertically connecting steel member 23 so as to hold the partition 26 in place, ending in to fix not only the partition 26 but also the horizontal beam wood member 25 firmly to the vertically connecting steel member 23.

Threaded ends of the vertically connecting steel members 23 thus carry the horizontal beam wood members 25 and partitions 26 are inserted into the perforations provided in the top annular shape steel member 21 and the bottom annular shape steel member 22 and fixed thereon by means of nuts 24, respectively.

Then droppings boards 26 are fixed to the horizontal beam wood members 25 ending in to fix the construction of the revolving cylindrical hen-house. To this end, it is preferable to extend a length of conventional wire rope around the half-constructed hen-house across the vertically connecting steel members arranged annularly, the length being the circumference of the top annular shape steel member 21, in order to keep the diameter D of the intermediate height equal to that at the top annular shape steel member 21. It is also preferable that droppings boards 28 for alternative nests arranged on a floor are fixed to the horizontal beam wood members 25 at first and then the other alternative spaces between two fixed droppings boards 28 are filled with other droppings boards. For the second round insertions of the droppings boards 28, it is preferred that the same be inserted externally radially and gently. If the droppings boards 28 are fixed to the horizontal beam wood members 25 side by side one after another, the circumference of the floor becomes apt to be out of roundness ending in difficulties with respect to, for example, a feeder 42.

Then a length of wire 41 is inserted through each vertically connecting steel member 23 one after another at each of various heights so as to form a circumferential partition arranged between an outer series of nests and an inner series of nests of each floor.

Figure 5:
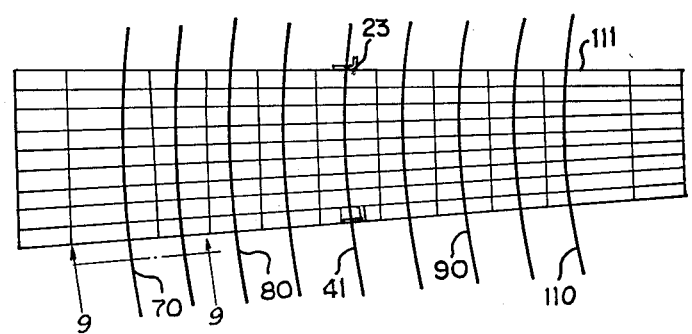
FIG. 5 is a partial plan view of the floor of the hen-house, to an enlarged scale, taken essentially along the line 5—5 of FIG. 2 and illustrating the verandas.
Figure 6:
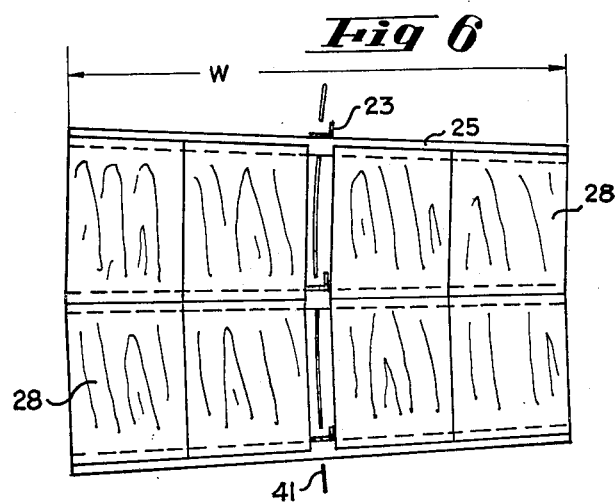
FIG. 6 is a partial plan view of the droppings boards, to a greatly enlarged scale, taken essentially on the line 6—6 of FIG. 2.

The bottom ends 221, 222, 223, and 224 of the wires constituting the partition nettings 26 are prefabricated as hooks, respectively. A length of wire 70 is extended circumferentially being held by a hook 221 of each of the successive partitions 26 and other wires 80, 90, and 100 are arranged similarly so as to set a prefabricated hurdle floor 111 thereon, as shown in FIGS. 2, 5, and 9. It is preferred that the hurdle floor 111 is extended into a veranda arranged radially in front of a nest and that the floor 111 is somewhat on the down grade towards the veranda.

Then lengths of metal wire 125, 126, 127, 128, 129, 130, and 131 are arranged circumferentially around the hen-house across the outer ends of the radial partitions 26 and held in place by corrugated pieces 52 which are then bound together with the outer ends of the partition nettings 26 by thinner wires. A prefabricated door 134 is inserted between a circumferentially arranged wire 127 and a frame prefabricated with metal wire 133 and bound therewith, so as to slide the door 134 upwardly for letting a hen in and out of the nests.

For the above stated construction, several dimensions are exemplified as follows:

Diameter of the revolving cylindrical hen-house: $D = 600$ cm.;
Number of the vertically connecting steel member: $n = 52$;
Width thereof (which is symmetrical): 2.5 cm.;
Thickness thereof: 0.3 cm.;
Thickness of droppings board: $e = 1$ cm.;
Radial length thereof: $w = 100$ cm.;
Height of a floor represented by a distance between two horizontal beam wood members: $h = 60$ cm.

In accordance with this invention, the droppings boards 28 are secured to the horizontal beam wood members 25 so that there is provided an integral ring for each floor resulting in to increase the geometrical moment of inertia extremely. The value for this construction becomes thousands of times that for such a construction which has not an integral ring. A ratio of deformations for such two constructions is approximately $$(w^3 e E_g)/12h \div (IinE_s)/\pi D$$
$$= ((100 \text{ cm.})^3 \times 1 \text{ cm.} \times 7.2 \times 10^4 \text{ kg./cm.}^2)/(12 \times 60 \text{ cm.})$$
$$\div (0.8 \text{ cm.}^4 \times 52 \times 2.1 \times 10^6 \text{ kg./cm.}^2)/(3.14 \times 600 \text{ cm.})$$
$$= 100,000,000/4.6400$$
$$= 2160$$

where $E_s = 2.1 \times 10^6$ kg./cm.$^2$ (tensile strength of steel);
$E_g = 7.2 \times 10^4$ kg./cm.$^2$ (tensile strength of wood); and
$Ii = 0.8$ cm.$^4$ (geometrical moment of inertia of a symmetrical angle of 2.5 cm. wide and 0.3 cm. thick).

Meantime, the deformation is considered to be approximately proportional to the cube of the diameter D. Therefore, when the diameter D is substantially large, the deformation becomes a serious question with respect to not only the action of a light external force for a long period, such as the friction of a droppings collector, but also an action of a heavy external force for a short period, such as a typhoon.

In accordance with this invention, partitions and droppings boards are fixed to horizontal beam wood members so as to form horizontal rings. By virtue of such a construction, the deformation becomes very small comparing with a construction where cages are hung from or placed on a framework. Furthermore, the latter construction requires additional materials and work so as to build strong. For all this, the latter construction is inferior to the former, in accordance with this invention, in \trength and precision. It is sure that the roundness and the level would be damaged if welding or drilling is effected in site.

In accordance with this invention, metal wire available on the market is utilized as far as possible, particularly circumferentially. By using it in such manner that the revolving cylindrical hen-house looks very fine externally. The arrangement of the metal wire in the construction has been studied particularly in view of durability. Preferably, iron wire of No. 10 to No. 14 wire gauge is used for most of the application in this construction, except for binding.

Figure 11:
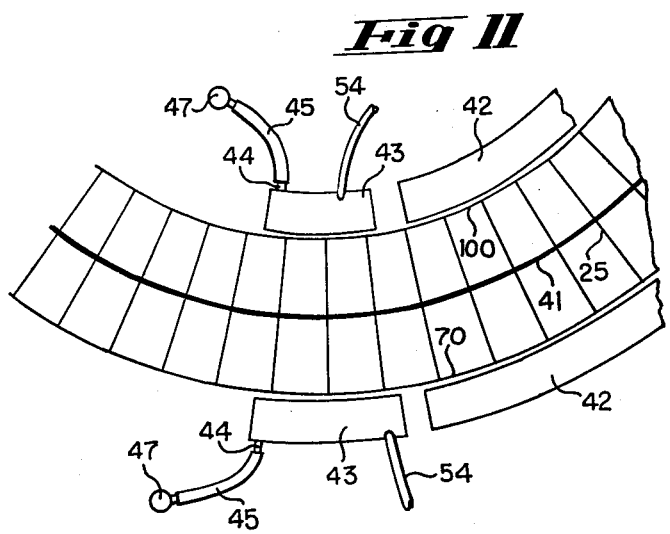
FIG. 11 is a greatly enlarged partial plan view illustrating the arrangement of the feeders and waterers.

Now referring to FIG. 11, it is necessary to arrange a feeder 42 and a waterer 43 along a series or a row of nests in a floor of the revolving cylindrical hen-house. A feeder may be usually constructed and manually handled, but a waterer is preferably prefabricated and built in site together with the above-stated revolving cylindrical hen-house. If there are two rows of nests, the inner row and the outer row, two waterers 43 are necessary for a floor. Preferably, a waterer 43 is to be arranged with respect to a feeder 42 in order that a hen faces the feeder 42 and then the waterer 43. The waterer 43 may also be arranged above the feeder 42 but it is not proper to arrange the waterer 43 before the feeder 42 with respect of the direction of revolution of the hen-house.

The prefabricated waterer 43 has a draining outlet 44 positioned near the bottom of the waterer and a faucet 54 positioned above it. It is preferred that the faucet 54 is of fishtail-shape.

That the site, a suitable stand is provided, on which a waterer 43 is placed for each floor of the revolving cylindrical hen-house. The faucet 54 is fixedly connected to a water supplying pipe 51, 52, 53, and 54. It is to be noted that a substantial water pressure is necessary to keep the waterer 43 hygienically.

A drain pipe 47 is prefabricated and built vertically by the stand in such a manner that it moves vertically by a suitable means, such as an electromagnetic means 48. The drain pipe 47 has junctions 46 equal to the number of the floors of the revolving cylindrical hen-house, each being connected to the draining outlet 44 of the waterer 43 by means of a flexible branch pipe 45. The branch pipe 45 is made of such a flexible material as vinyl chloride resin, india rubber, polyethylene resin, or the like, so that the drain pipe 47 is permitted to move vertically while connected to the waterer 43 fixed in place. It is to be understood that the required lift of the drain pipe 47 corresponds to the sum of the height of the waterer 43 and the head provided between the draining outlet 44 and the junction 46.

The watering system may be operated automatically by a suitable means. At first a quantity of water which is sufficient to overflow the junction 46 of the upper-positioned drain pipe 47 is supplied to the waterer 43. Then the drain pipe 47 is lowered and the pressure for supplying water is increased so that water within the waterer 43 is exhausted completely together with any dirt in the waterer 43. It is preferred to increase the water pressure in the water supplying pipes 51, 52, and 53 during the time the drain pipe 47 is lower-positioned. Subsequently the drain pipe 47 is lifted and the water pressure for supplying water is returned to the normal state. After a suitable period the above cycle may be repeated, considering the revolving cycle of the hen-house. This automation may be effected by the revolution of the hen-house.

While a particular embodiment of the invention has been illustrated and described, modifications thereof will readily occur to those skilled in the art. It should be understood therefore that the invention is not limited to the particular arrangement disclosed but the appended claims are intended to cover all modifications which do not depart from the true spirit of the invention.

What I claim is:

1. A prefabricated cylindrical and rotatable hen-house capable of shipment in the disassembled or knocked down condition and capable of on-site erection by unskilled labor without the use of special tools or equipment: said hen house comprising, in combination, a relatively elongated vertical central mast; a thrust bearing on the upper end of said mast including a lower fixed plate, an upper rotatable plate having perforations spaced substantially uniformly of its periphery, and bearing elements between said plates, a pair of substantially congruent relatively large diameter annular upper and lower metal members concentric with said mast, said members having perforations spaced uniformly of their peripheries; a plurality of radial spokes connected at opposite ends to said upper rotatable plate and to said upper member to suspend the latter for rotation about said mast; a plurality of relatively elongated rigid metal uprights having their ends connected to said upper and lower members and spaced substantially uniformly therearound, said uprights maintaining said upper and lower members in fixed axially spaced relation; said uprights having a plurality of apertures at corresponding vertically spaced locations therealong; guiding roller means arranged beneath said lower member and spaced peripherally thereof for guiding engagement therewith during rotation of the hen house about said mast; plural wooden beams mounted at uniformly vertically spaced locations on each upright, each beam being secured substantially mid-way of its ends to its associated upright and extending horizontally and radially; wire mesh radial partitions having vertical wires hooked at both ends, each beam having a partition hooked at its upper end into perforations in the beam for suspension from the latter to extend longitudinally of the beam; each partition terminating short of the next lower beam; plural annularly extending wires each supported in the hooked lower ends of correspondingly radially located vertical wires of the partitions; truncated sector-shaped hurdle floors each supported on said annular wires between a circumferentially adjacent pair of radial partitions; trapezoidal droppings boards each secured to a circumferentially adjacent pair of beams and spaced beneath a hurdle floor; and a plurality of wires extending horizontally through the vertically spaced perforations of said uprights and conjointly forming a vertically extending annular partition dividing the hen house into radially inner and outer sections; substantially all of the weight of the hen house being supported by said central mast, with said guiding roller means having substantially only guiding engagement with said lower annular member.

2. A prefabricated cylindrical rotatable hen house, as defined in claim 1, including a second series of wires extending annularly of the hen house in engagement with the radially outer and radially inner vertical wires of the radial partitions; said second series of wires extending horizontally around the hen house and forming the radially inner and outer circumferential walls thereof.

3. A prefabricated cylindrical rotatable hen house, as defined in claim 1, including wires extending vertically of each upright and overlying the horizontal wires of said radial partitions, said last-named vertically extending wires being secured tightly to each associated upright to hold said radial partitions in firm engagement therewith.

4. A prefabricated cylindrical rotatable hen house, as defined in claim 1, in which the lengths of the vertical wires of said radial partitions increase uniformly radially inwardly and radially outwardly of the associated upright; whereby said hurdle floors of the two sections of the hen-house slope outwardly from said annular partition.

5. A prefabricated cylindrical rotatable hen house, as defined in claim 3, in which the wires of said last-named series, between vertically adjacent wooden beams, are divided into two vertically spaced groups; and door means each closing the space between each pair of groups.

References Cited in the file of this patent

UNITED STATES PATENTS

| 406,248 | Williams | July 2, 1889 |
|---|---|---|
| 1,522,870 | Dean | Jan. 13, 1925 |
| 2,257,734 | Cornell | Oct. 7, 1941 |
| 2,585,698 | Spring | Feb. 12, 1952 |
| 2,698,599 | Kalmoe | Jan. 4, 1955 |
| 2,735,400 | Stubbs | Feb. 21, 1956 |
| 3,018,759 | Helbig | Jan. 30, 1962 |